Patented Aug. 19, 1952

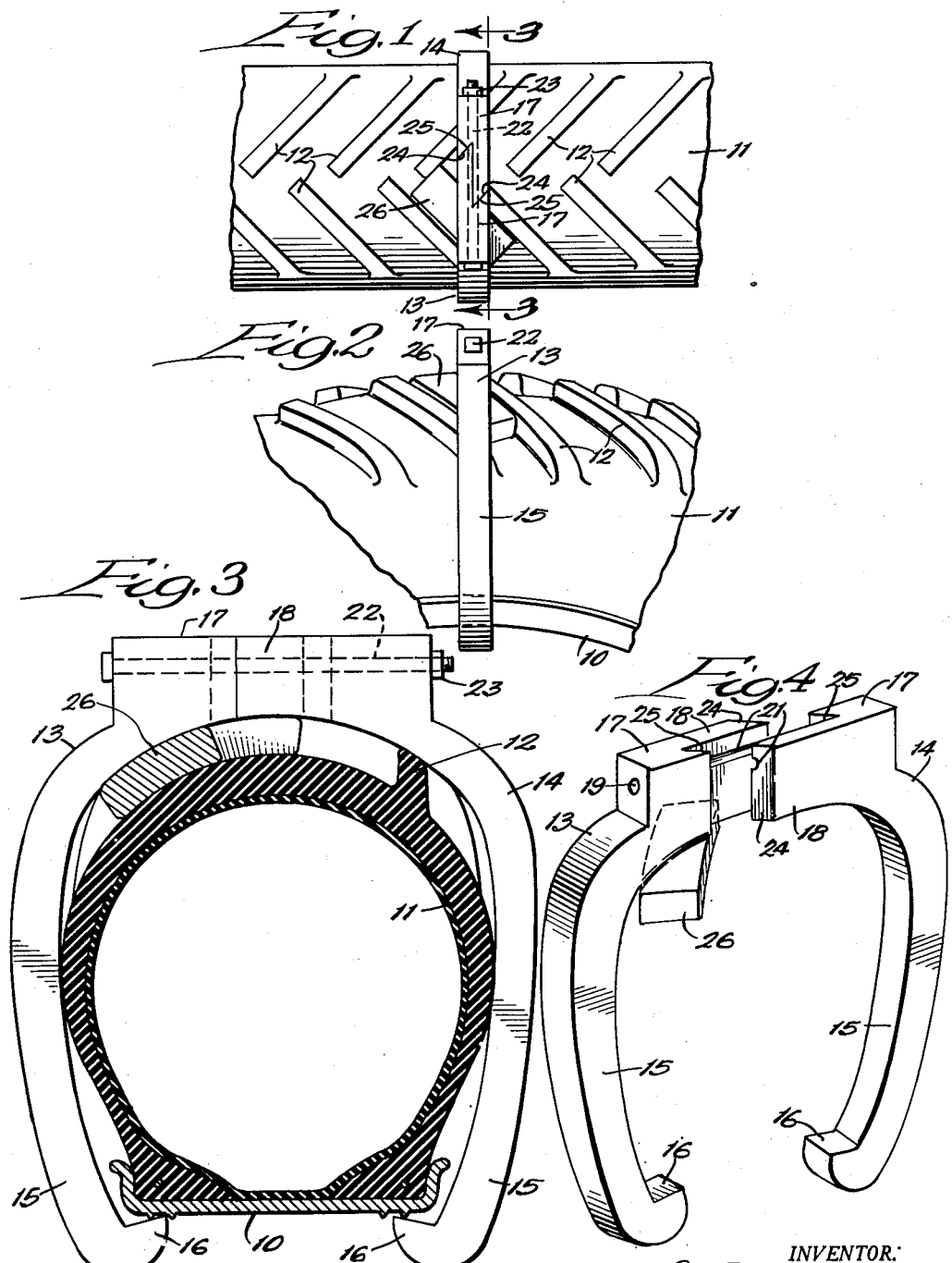

2,607,389

UNITED STATES PATENT OFFICE 2,607,389

TRACTION DEVICE FOR VEHICLE WHEELS

George L. Bumbaugh, Oaklawn, Ill.

Application August 25, 1950, Serial No. 181,529

8 Claims. (Cl. 152—228)

This invention relates to a traction device for vehicle wheels and more particularly to a crown clamp lug to be detachably secured to wheels equipped with pneumatic tires.

Vehicles such as tractors, trucks and the like are frequently required to operate in mud or in sand or soft ground where the tires will normally slip without developing any appreciable traction. In my copending application Serial No. 74,181 filed February 2, 1949, there is disclosed and claimed a lug to be detachably connected to the wheels of such vehicles to enable them to pull themselves out of mud or soft ground even when loaded. The present invention relates to improvements in lugs of this type.

It is one of the objects of the present invention to provide a traction device formed by a pair of detachably connected sections interfitting to produce an extremely rigid assembly and which can easily and quickly be assembled on a wheel.

Another object is to provide a traction device in which one of the sections includes a guide block to interfit with the tread of the tire to hold the device firmly.

Still another object is to provide a traction device which is connected to the rim of the wheel and engages the tread portion of the tire to minimize possible damage to the tire.

The above and other objects and advantages of the invention will be more readily apparent when read in connection with the accompanying drawing in which:

Figure 1 is a partial plan view of a tire equipped with a traction device embodying the invention;

Figure 2 is a side elevation;

Figure 3 is an enlarged transverse section along the line 3—3 of Figure 1; and

Figure 4 is a disassembled perspective view of the traction device.

The traction device of the present invention is adapted to be applied to wheels of vehicles equipped with pneumatic tires and is illustrated in connection with a standard tractor wheel. As shown, the wheel includes a metal rim 10 to receive the bead of a pneumatic tire 11. The tire 11 is of the type conventionally used on tractors such as agricultural tractors, earth moving machinery and the like and is formed with raised treads 12 extending inward from the sides of the tire toward the center plane of the tire. Treads of this type are extensively used on such vehicles.

The traction device of the present invention comprises a pair of curved sections 13 and 14 which are generally L-shaped. Each of the sections includes a side lug 15 to extend over the sides of the tire and terminates at its inner end in a hook 16 to hook under the rim 10 as shown in Figure 3. Preferably the sides 15 are so shaped that they are spaced from the sides of the tire at least throughout the major portion of their length, so that the relatively weak side walls of the tire will not be cut or chafed even under extreme service conditions.

At their outer ends, the sections terminate in head portions 17 from which integral tongues 18 project. The tongues 18 are preferably half the thickness of the head portions 17 so that when the sections are assembled together as illustrated in Figures 1-3, they overlap each other over the center tread portion of the tire. It will be noted that each of the tongues 18 extends throughout the full radial thickness of the sections so that the sections can easily be formed and will be rigidly held together when assembled.

To draw the sections together, the head portions 17 are formed with registering aligned openings 19 and the inner meeting faces of the tongues are formed with registering grooves 21 aligned with the openings 19. A tension fastening such as a bolt 22 extends through the openings 19 and the grooves 21 and may carry a nut 23 so that the sections can be drawn tightly together over the tire to form a rigid unit.

To insure that the sections will be rigidly connected and held against relative twisting movement, the ends of the tongues 18 are preferably cut off at an angle as indicated at 24 to be wedge shaped. The tongues are joined to their respective heads 17 by shoulders 25 lying at acute angles to the adjacent tongue faces to provide wedge shaped pockets. When the sections are assembled, the wedge shaped ends 24 of the tongues will fit into the wedge shaped pockets against the shoulders 25 to lock the sections rigidly together so that they cannot swing or twist relative to each other.

To prevent any possible slipping of the device on the tire during use, a guide block 26 is connected to the inner surface of one of the head portions 17. As shown the block 26 is a relatively long narrow block and lies at an acute angle to the section on which it is mounted to fit between adjacent raised treads 12 on the tire. It will be noted that only one such guide block is employed and I have found that this is adequate to prevent slipping either circumferentially or laterally of the tire.

With the unit assembled on a tire it provides a lug surface projecting a substantial distance outwardly from the tire to grip in mud or soft soil so that a substantial traction will be developed and tractors or trucks which are actually stuck can pull themselves out under their own power. It is furthermore apparent that the device can easily be applied at one or more points on the tire, even when the vehicle is stuck and can easily be removed when operating on dry ground or paved surfaces. Furthermore, since the device engages the tire only at its outer tread surface where the tire is extremely strong the tires will not be damaged and due to the fact that the device engages the rim of the wheel itself, there is no possibility of its slipping off even under extreme service conditions.

While one embodiment of the invention has been shown and described in detail herein, it will be understood that this is illustrative only and is not to be taken as a definition of the scope of the invention, reference being had for this purpose to the appended claims.

What is claimed is:

1. A traction device for a vehicle wheel having a rim with a tire thereon comprising a pair of detachable curved sections having outer ends to fit together over the tire and to project radially beyond the tire an amount equal to their radial thickness, relatively thin tongues at the outer ends of the sections extending throughout the full radial thickness thereof to overlap over the tire, the tongues terminating in wedge shaped ends, shoulders joining the tongues to the outer ends of the sections and lying at acute angles to the tongues to form wedge shaped pockets each to receive the wedge shaped end of a tongue and a tension fastening to draw the outer ends of the sections together.

2. A traction device for a vehicle wheel having a rim with a tire thereon comprising a pair of detachable curved sections having outer ends to fit together over the tire and to project radially beyond the tire an amount equal to their radial thickness, relatively thin tongues at the outer ends of the sections extending throughout the full radial thickness thereof to overlap face to face over the tire, the tongues terminating in wedge shaped ends, shoulders joining the tongues to the outer ends of the sections and lying at acute angles to the tongues to form wedge shaped pockets each to receive the wedge shaped end of a tongue, the outer ends of the sections having aligned openings therethrough and the meeting faces of the tongues having registering grooves therein aligned with the openings and a tension fastening extending through the openings and grooves.

3. A traction device for a vehicle wheel having a rim with a tire thereon comprising a pair of detachable curved sections having inner ends to extend toward the rim and outer ends to fit together over the tire and to project radially beyond the tire an amount equal to their radial thickness, relatively thin tongues at the outer ends of the sections extending throughout the full radial thickness thereof to overlap over the tire, the tongues terminating in wedge shaped ends, shoulders joining the tongues to the outer ends of the sections and lying at acute angles to the tongues to form wedge shaped pockets each to receive the wedge shaped end of a tongue, inwardly extending hook portions at the inner ends of the sections to engage the rim, and a tension fastening engaging the sections to draw them together.

4. A traction device for a vehicle wheel having a rim with a tire thereon formed with raised treads extending inward at acute angles to the sides of the tire from the sides of the tire toward the center thereof, said traction device comprising a pair of detachable curved sections to fit together over the tire and having outer ends to overlie the treads on the tire, fastening means to draw the sections together, and a guide block carried by the outer end of one of the sections at its inner surface and lying at an acute angle thereto to fit between adjacent raised treads on the tire.

5. A traction device for a vehicle wheel having a rim with a tire thereon formed with raised treads extending inward at acute angles to the sides of the tire from the sides of the tire toward the center thereof, said traction device comprising a pair of detachable curved sections to fit together over the tire and having outer ends to overlie the treads on the tire, relatively thin tongues at the outer ends of the sections to overlap over the treads on the tire, the outer ends of the sections having aligned openings therethrough, a tension fastening extending through the openings to draw the sections together, and a guide block carried by the outer end of one of the sections at its inner surface and lying at an acute angle thereto to fit between adjacent raised treads on the tire.

6. A traction device for a vehicle wheel having a rim with a tire thereon formed with raised treads extending inward at acute angles to the sides of the tire from the sides of the tire toward the center thereof, said traction device comprising a pair of detachable curved sections to fit together over the tire and having outer ends to overlie the treads on the tire, relatively thin tongues at the outer ends of the sections to overlap over the treads on the tire, the tongues terminating in wedge shaped ends, shoulders joining the tongues to the outer ends of the sections and lying at acute angles to the tongues to form wedge shaped pockets each to receive the wedge shaped end of a tongue on the other section.

7. A traction device for a vehicle wheel having a rim with a tire thereon formed with raised treads extending inward at acute angles to the sides of the tire from the sides of the tire toward the center thereof, said traction device comprising a pair of detachable curved sections to fit together over the tire having inner ends extending toward the rim and outer ends to overlie the tire, hooks on the inner ends of the sections to hook over the rim, a tension fastening engaging the sections to draw them together, and a guide block carried by the outer end of one of the sections at its inner surface and lying at an acute angle thereto to fit between adjacent raised treads on the tire.

8. A traction device for a vehicle wheel having a rim with a tire thereon formed with raised treads extending inward at acute angles to the sides of the tire from the sides of the tire toward the center thereof, said traction device comprising a pair of detachable curved sections to fit together over the tire having inner ends extending toward the rim and outer ends to overlie the tire, hooks on the inner ends of the sections to hook over the rim, relatively thin tongues projecting from the outer ends of the sections to overlap over the tire, the tongues terminating in wedge shaped ends, shoulders joining the tongues to the outer ends of the sections and lying at acute angles to the tongues to form wedge shaped pockets each to receive the wedge shaped end of a tongue on the other section, a tension fastening to draw the outer ends of the sections together, and a guide block carried by the outer end of one of the sections at its inner surface and lying at an acute angle thereto to fit between adjacent raised treads on the tire.

GEORGE L. BUMBAUGH.

REFERENCES CITED

The following references are of record in the file of this patent:

UNITED STATES PATENTS

| Number | Name | Date |
|---|---|---|
| 1,441,645 | Van Orden | Jan. 9, 1923 |
| 1,499,036 | Smith | June 24, 1924 |
| 1,779,689 | Bechtold | Oct. 28, 1930 |
| 2,343,131 | Austin | Feb. 29, 1944 |
| 2,474,262 | Linderme | June 28, 1949 |